(12) United States Patent  
Seo et al.

(10) Patent No.: US 11,703,442 B2  
(45) Date of Patent: Jul. 18, 2023

(54) HIGH EFFICIENCY AND HIGH SENSITIVITY PARTICLE CAPTURE TYPE TERAHERTZ SENSING SYSTEM

(71) Applicant: KOREA INSTITUTE OF SCIENCE AND TECHNOLOGY, Seoul (KR)

(72) Inventors: Minah Seo, Seoul (KR); Yong-Sang Ryu, Seoul (KR); Eui-Sang Yu, Seoul (KR); Taikjin Lee, Seoul (KR); Hyun Seok Song, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 182 days.

(21) Appl. No.: 17/138,919

(22) Filed: Dec. 31, 2020

(65) Prior Publication Data

US 2021/0389228 A1    Dec. 16, 2021

(30) Foreign Application Priority Data

Jun. 12, 2020   (KR) .................. 10-2020-0071241

(51) Int. Cl.
*G01N 21/3581* (2014.01)
*G01N 15/14* (2006.01)

(52) U.S. Cl.
CPC ..... *G01N 15/1434* (2013.01); *G01N 15/1404* (2013.01); *G01N 2015/1415* (2013.01)

(58) Field of Classification Search
CPC ........... G01N 15/1434; G01N 15/1404; G01N 2015/1415; G01N 21/3581;
(Continued)

(56) References Cited

U.S. PATENT DOCUMENTS 9,039,883 B2   5/2015   Guerrieri et al.
9,891,157 B2   2/2018   Bocchi et al.
(Continued)

FOREIGN PATENT DOCUMENTS

KR         100849928 B1   8/2008
KR      1020120093629 A   8/2012
(Continued)

OTHER PUBLICATIONS

Translation of WO-2019182186-A1 (Year: 2019).*
(Continued)

*Primary Examiner* — David P Porta
*Assistant Examiner* — Mamadou Faye
(74) *Attorney, Agent, or Firm* — Cantor Colburn LLP

(57) ABSTRACT

Provided is a high efficiency and high sensitivity particle capture type terahertz sensing system. The particle capture type terahertz sensing system includes a sensing substrate to capture particles, and a terahertz sensor to emit terahertz electromagnetic waves to the sensing substrate to sense the particles, wherein the sensing substrate includes a base substrate and a particle capture structure layer formed on the base substrate, the particle capture structure layer includes a plurality of slits for focusing the terahertz electromagnetic waves, the particle capture structure layer captures the particles in the plurality of slits using dielectrophoresis, and an area in which the terahertz electromagnetic waves converge to the plurality of slits matches an area in which the particles are captured in the plurality of slits through the dielectrophoresis.

10 Claims, 11 Drawing Sheets

(58) Field of Classification Search
CPC ... G01N 2015/0038; G01N 2015/0065; G01N 15/0612; G01N 21/3586; G01N 1/40; B03C 2201/24; B03C 5/026; B03C 5/005
See application file for complete search history.

(56) References Cited

U.S. PATENT DOCUMENTS

2017/0082540 A1    3/2017  Seo et al.
2021/0041356 A1*   2/2021  Pan ..................... G01N 21/553

FOREIGN PATENT DOCUMENTS

| KR | 10-1542109 B1 | 8/2015 | |
|---|---|---|---|
| KR | 101721976 B1 | 3/2017 | |
| KR | 10-2017-0036891 A | 4/2017 | |
| KR | 102060099 B1 | 12/2019 | |
| WO | WO-2019182186 A1 * | 9/2019 | ......... G01N 15/1056 |

OTHER PUBLICATIONS

Dong-Kyu Lee et al., "Highly sensitive and selective sugar detection by terahertz nano-antennas," Scientific Reports, Oct. 23, 2015, vol. 5, No. 15459.

* cited by examiner

HIGH EFFICIENCY AND HIGH SENSITIVITY PARTICLE CAPTURE TYPE TERAHERTZ SENSING SYSTEM

DESCRIPTION OF GOVERNMENT-FUNDED RESEARCH AND DEVELOPMENT

This research is conducted by support of the individual basic research project "terahertz molecule sensor active control technology" (Project serial number: 1711107950) of the Ministry of Science and ICT under the supervision of National Research Foundation of Korea.

CROSS-REFERENCE TO RELATED APPLICATION

This application claims priority to Korean Patent Application No. 10-2020-0071241, filed on Jun. 12, 2020, and all the benefits accruing therefrom under 35 U.S.C. § 119, the contents of which in its entirety are herein incorporated by reference.

TECHNICAL FIELD

The present disclosure relates to a particle capture type terahertz sensing system. More particularly, the present disclosure relates to a high efficiency and high sensitivity particle capture type terahertz sensing system for detecting traces of molecules by concentrating particles on a specific location having the highest sensitivity of a metamaterial-based sensing substrate and amplifying optical signals a few hundreds of times or higher.

BACKGROUND ART

A terahertz electromagnetic wave is defined as an electromagnetic wave in the range between 0.1 and 10 THz on the basis of the frequency (1 THz), or $10^{12}$ cycles per second. The electromagnetic waves in this range are non-ionizing, and therefore electromagnetic waves within the threshold are not harmful for the human body and can pass through various types of materials except metals. Due to the ability to pass through, the terahertz electromagnetic waves can easily detect metal weapons concealed underneath clothing, and instead of x-rays, they are developed as millimeter wave scanners and used in airports.

Additionally, a terahertz molecule sensor has been proposed to measure and quantify traces of biochemical samples using a metamaterial-based sensing substrate designed in combination of a specific structure and material. The terahertz metamaterial-based sensing platform technology is based on technology that observes the optical properties with sensitivity by contact between a sample to be measured and a metamaterial array. Since the unique vibration frequency of molecules usually exist in infrared and terahertz ranges, the terahertz spectroscopy having a broadband spectrum achieves 'high sensitivity and high selectivity molecule sensing' for selectively measuring only the properties of a specific molecule. The 'high sensitivity and high selectivity molecule sensing' is a result of fusion of the spectrum characteristics of broadband terahertz spectroscopy and technology that amplifies a signal in a specific terahertz frequency range using a metamaterial. The metamaterial may focus electromagnetic waves to a very small area relative to the wavelength beyond the wavelength limitation. The metamaterial enhances the transmittance (or reflectance) efficiency by 100 to 10,000 times or higher compared to the existing simple terahertz electromagnetic wave oscillation device. The efficiency of the metamaterial may be determined by the design of the metamaterial. Among various designs of the metamaterial, in case that rectangular holes are repeatedly arranged, the resonance characteristics of the terahertz electromagnetic waves that interact with each other change depending on the width and length of the hole.

However, in case that a solution-based sample is measured, when the solution is applied to the sensing substrate, solutes (ions or gas molecules) or microparticles are randomly distributed in the solution. The solutes or microparticles are randomly distributed irrespective of the structure of hotspot of the sensing platform. When the solution gets dry over time, the solutes or microparticles are pulled outwards together and distributed at a high concentration along a ring shaped strip known as a coffee-ring. Due to the coffee-ring effect, it is very difficult to actually measure and analyze the concentration of the solution using the optical sensing platform.

That is, to sense traces of particles with efficiency and high sensitivity, there is a need for development and research of technology that collects and concentrates floating particulates in vapor/liquid phase on a terahertz signal focusing area corresponding to a sensor.

DISCLOSURE

Technical Problem

The present disclosure is designed to solve the above-described problem of the related art, and therefore the present disclosure is directed to providing a high efficiency and high sensitivity particle capture type terahertz sensing system for detecting traces of molecules by concentrating particles on a specific location having the highest sensitivity of a metamaterial-based sensing substrate, and amplifying optical signals a few hundreds of times or higher.

Technical Solution

A particle capture type terahertz sensing system according to an embodiment of the present disclosure includes a sensing substrate to capture particles, and a terahertz sensor to emit terahertz electromagnetic waves to the sensing substrate to sense the particles, wherein the sensing substrate includes a base substrate and a particle capture structure layer formed on the base substrate, the particle capture structure layer includes a plurality of slits for focusing the terahertz electromagnetic waves, the particle capture structure layer captures the particles in the plurality of slits using dielectrophoresis, and an area in which the terahertz electromagnetic waves converge to the plurality of slits matches an area in which the particles are captured in the plurality of slits through the dielectrophoresis.

A sensing substrate according to another embodiment of the present disclosure is a sensing substrate that captures particles for sensing using terahertz electromagnetic waves, and includes a base substrate, and a particle capture structure layer formed on the base substrate, wherein the particle capture structure layer includes a plurality of slits for focusing the terahertz electromagnetic waves, the particle capture structure layer captures the particles in the plurality of slits using dielectrophoresis, and an area in which the terahertz electromagnetic waves converge to the plurality of slits matches an area in which the particles are captured in the plurality of slits through the dielectrophoresis.

Advantageous Effects

The sensing substrate according to an embodiment of the present disclosure and the sensing system comprising the same may provide terahertz sensing with higher sensitivity as the sensing hotspot area in which the terahertz electromagnetic waves converge matches the particle hotspot area in which particles are captured by dielectrophoresis.

BEST MODE

Figure 1:
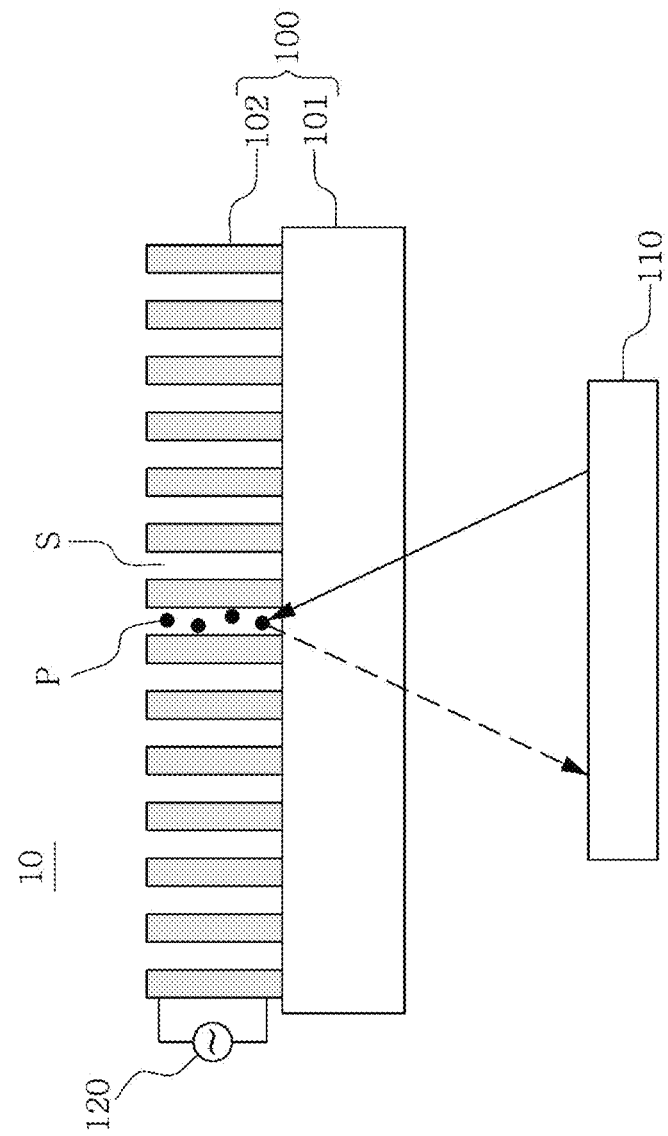
FIG. 1 is a cross-sectional view showing a schematic configuration of a particle capture type terahertz sensing system 10 according to an embodiment of the present disclosure.

The following detailed description is made reference to the accompanying drawings showing a specific embodiment in which the present disclosure is carried out by way of illustration. These embodiments are described in sufficiently detail for those skilled in the art to practice the present disclosure. It should be understood that various embodiments of the present disclosure are different but do not need to be mutually exclusive. For example, particular shapes, structures and features described herein in connection with one embodiment can be embodied in other embodiment without departing from the spirit and scope of the present disclosure. It should be further understood that changes can be made to positions or placement of individual elements in each disclosed embodiment without departing from the spirit and scope of the present disclosure. Accordingly, the following detailed description is not intended to be limiting, and the scope of the present disclosure is only defined by the appended claims along with the full scope of equivalents to which such claims are entitled. In the drawings, similar reference signs denote same or similar functions in many aspects.

The terms as used herein are general terms selected as those being now used as widely as possible in consideration of functions, but they may vary depending on the intention of those skilled in the art or the convention or the emergence of new technology. Additionally, in certain cases, there may be terms arbitrarily selected by the applicant, and in this case, the meaning will be described in the corresponding description part of the specification. Accordingly, it should be noted that the terms as used herein should be interpreted based on the substantial meaning of the terms and the context throughout the specification, rather than simply the name of the terms.

FIG. 1 is a cross-sectional view showing a schematic configuration of a particle capture type terahertz sensing system 10 according to an embodiment of the present disclosure.

Referring to FIG. 1, the particle capture type terahertz sensing system 10 according to an embodiment of the present disclosure includes a sensing substrate 100, a terahertz sensor 110 and a voltage supply 120.

The sensing substrate 100 may capture particles P to be sensed, and converge terahertz electromagnetic waves onto a location of the captured particles. The sensing substrate 100 may include a base substrate 101 and a particle capture structure layer 102 disposed on the base substrate 101.

The base substrate 101 may be a substrate that allows the terahertz electromagnetic waves to pass through. For example, the base substrate 101 may be a silicon (Si) substrate, but is not limited thereto.

The particle capture structure layer 102 may be formed on the base substrate 101. The particle capture structure layer 102 may be a structure designed to capture the particles to be sensed, and converge the terahertz electromagnetic waves onto the captured particles. The structure of the particle capture structure layer 102 itself may be referred to as a metamaterial.

The terahertz sensor 110 is configured to emit the terahertz electromagnetic waves to the sensing substrate 100. The terahertz electromagnetic wave is defined as an electromagnetic wave in the range between 0.1 and 10 THz on the basis of the frequency (1 THz), or $10^{12}$ cycles per second, and the electromagnetic waves in this range are non-ionizing, and therefore electromagnetic waves within the threshold are not harmful for the human body and can pass through various types of materials except metals.

As shown in FIG. 1, the terahertz sensor 110 may be positioned below the sensing substrate 100 to emit the terahertz electromagnetic waves to one surface of the sensing substrate 100, and converge the terahertz electromagnetic waves reflected off of one surface of the sensing substrate 100 to sense the particles captured in the sensing substrate 100. The present disclosure is not limited thereto, and the terahertz sensor 110 may emit the terahertz electromagnetic waves to the sensing substrate 100, and converge the terahertz electromagnetic waves passing through the sensing substrate 100 to sense the particles captured in the sensing substrate 100. For example, configuration for emitting the terahertz electromagnetic waves may be positioned below the sensing substrate 100, and configuration for receiving the external terahertz electromagnetic waves may be positioned on the sensing substrate 100.

The voltage supply 120 may provide an alternating current (AC) voltage for inducing dielectrophoresis to the sensing substrate 100.

Hereinafter, the configuration and function of the particle capture structure layer 102 of the particle capture type terahertz sensing system 10 according to this embodiment will be described in more detail.

Figure 2:
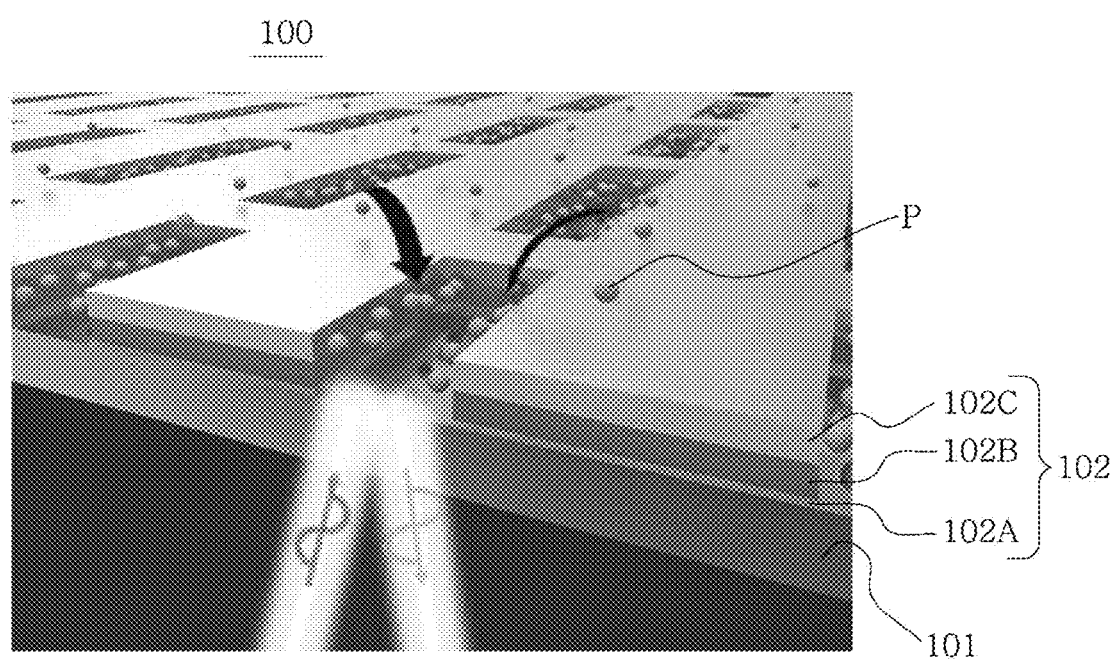
FIG. 2 is an exemplary diagram showing particles captured in a sensing substrate.
Figure 3:
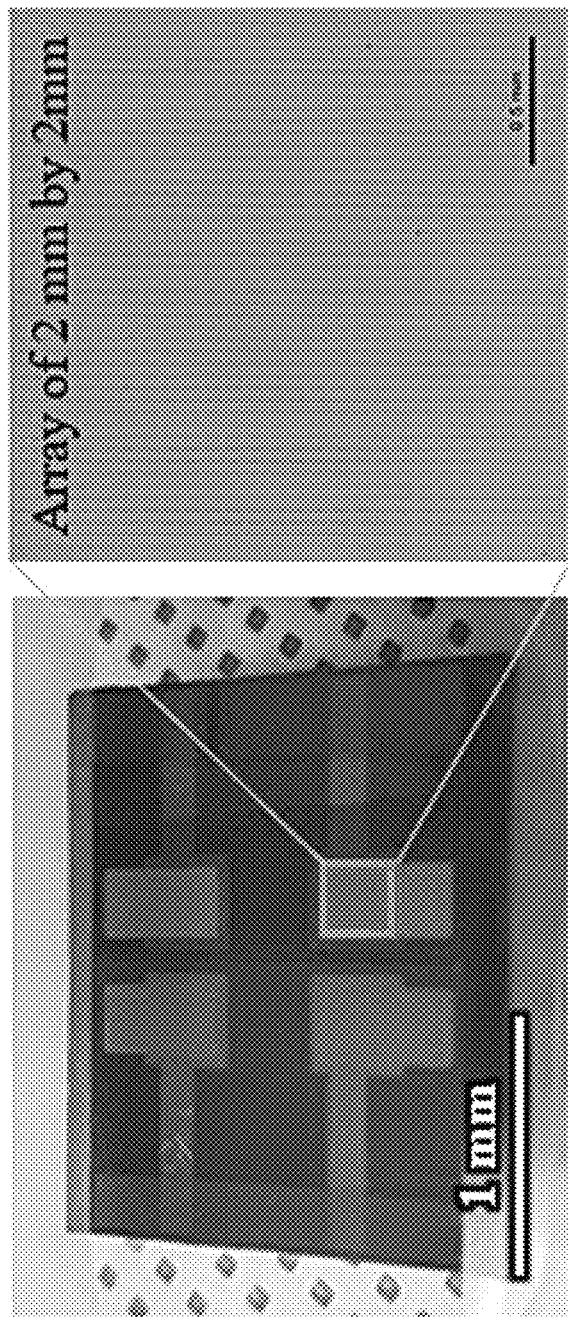
FIGS. 3 to 5 show a fabrication example of a sensing substrate.
Figure 4:
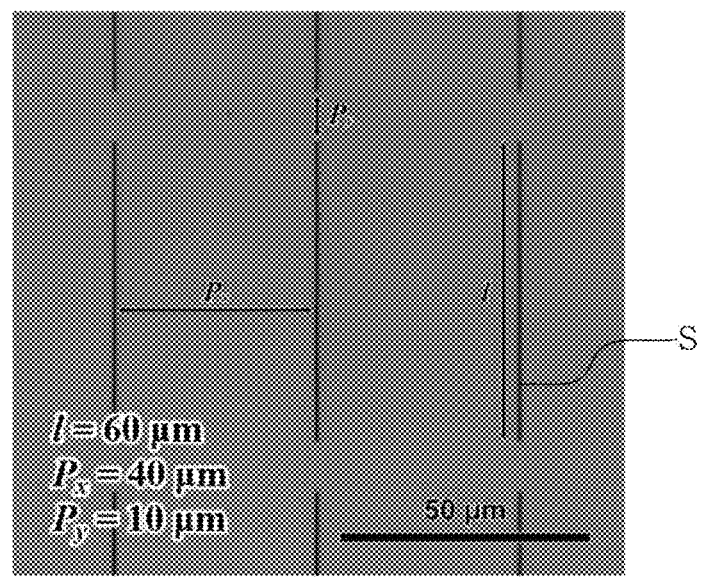
Figure 5:
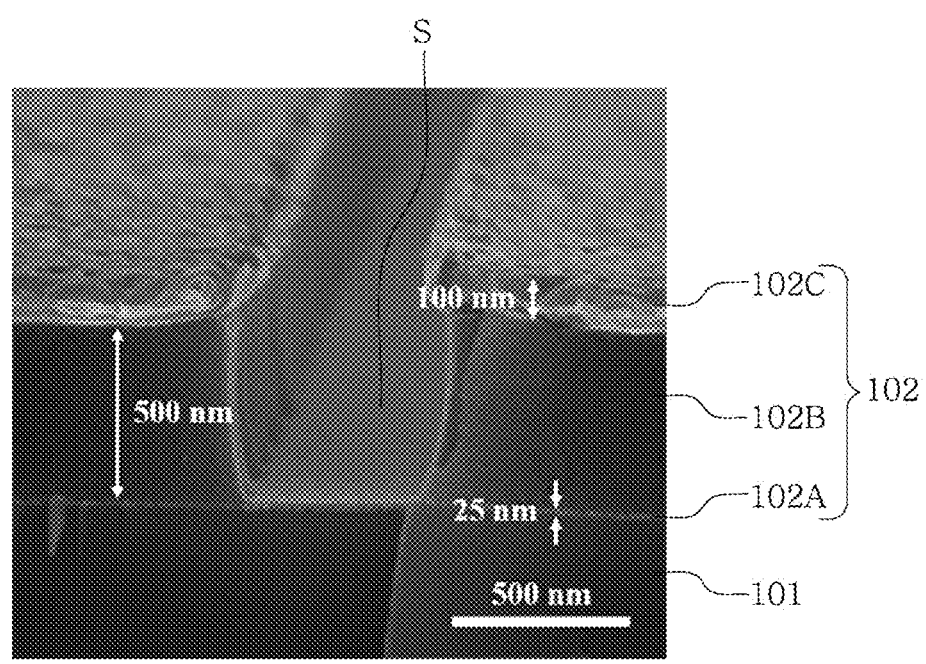
Figure 6:
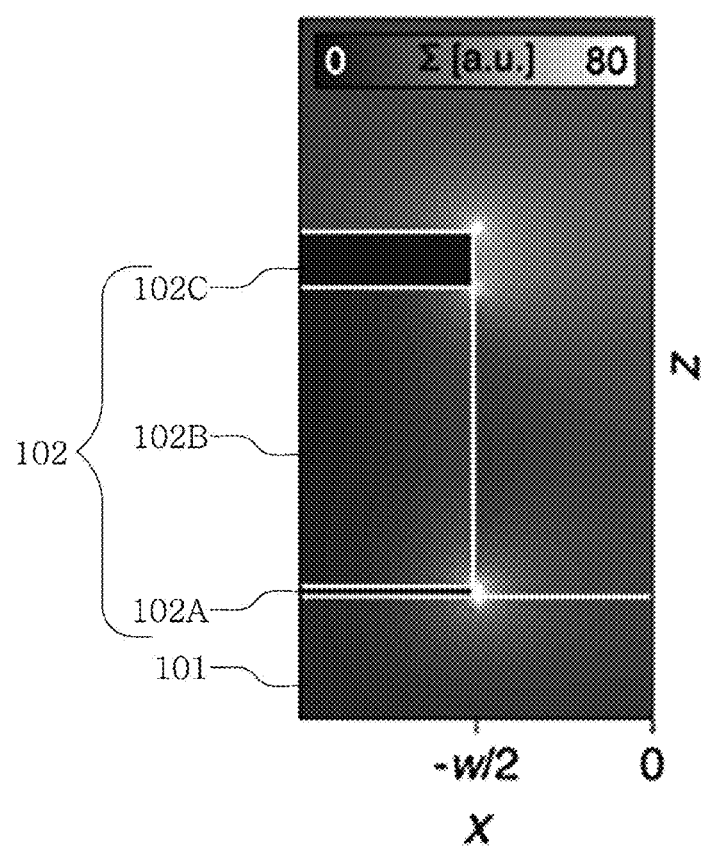
FIGS. 6 and 7 are exemplary diagrams showing an area in which terahertz electromagnetic waves converge to a particle capture structure layer.
Figure 7:
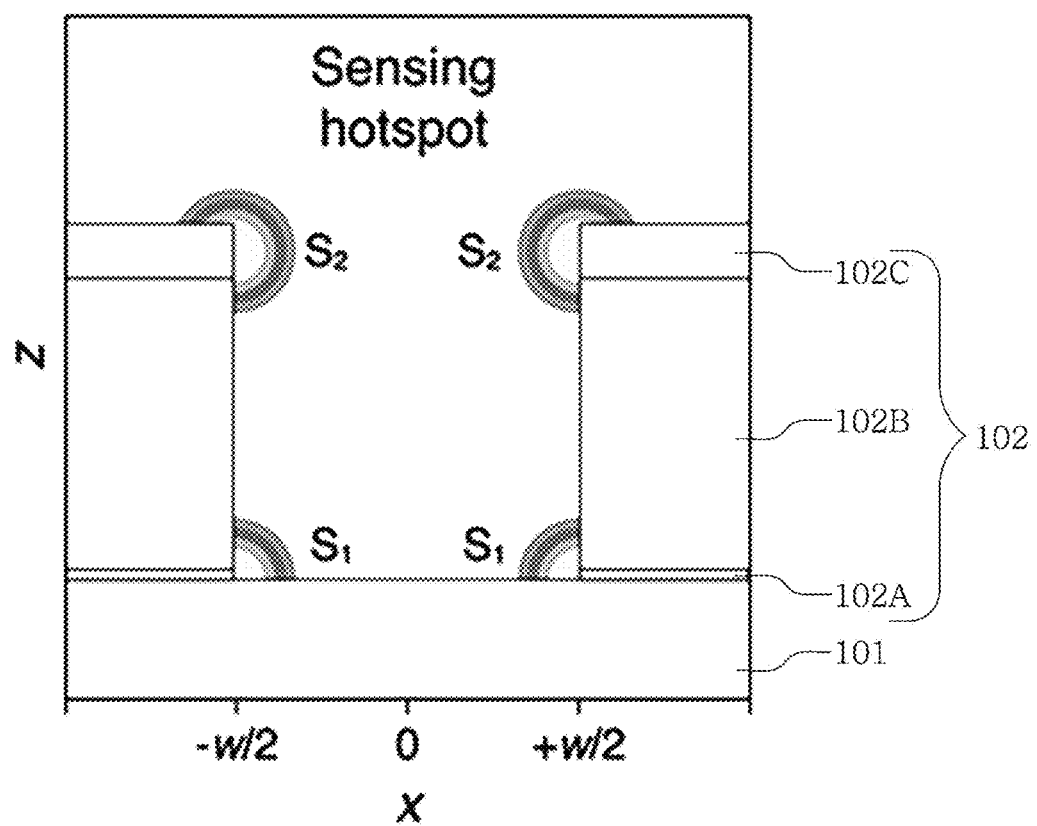
Figure 8:
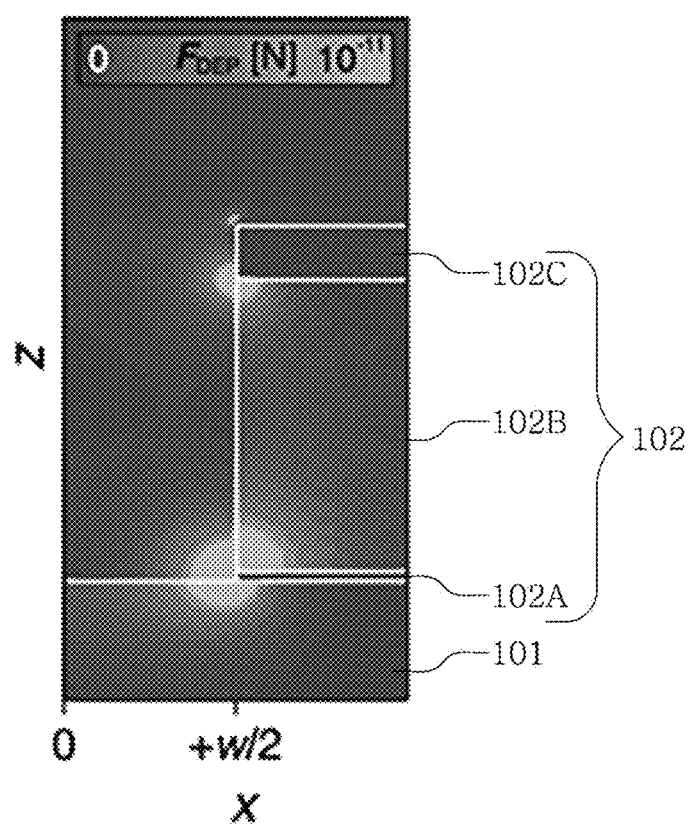
FIGS. 8 and 9 are exemplary diagrams showing an area in which particles are concentrated and captured in a particle capture structure layer.
Figure 9:
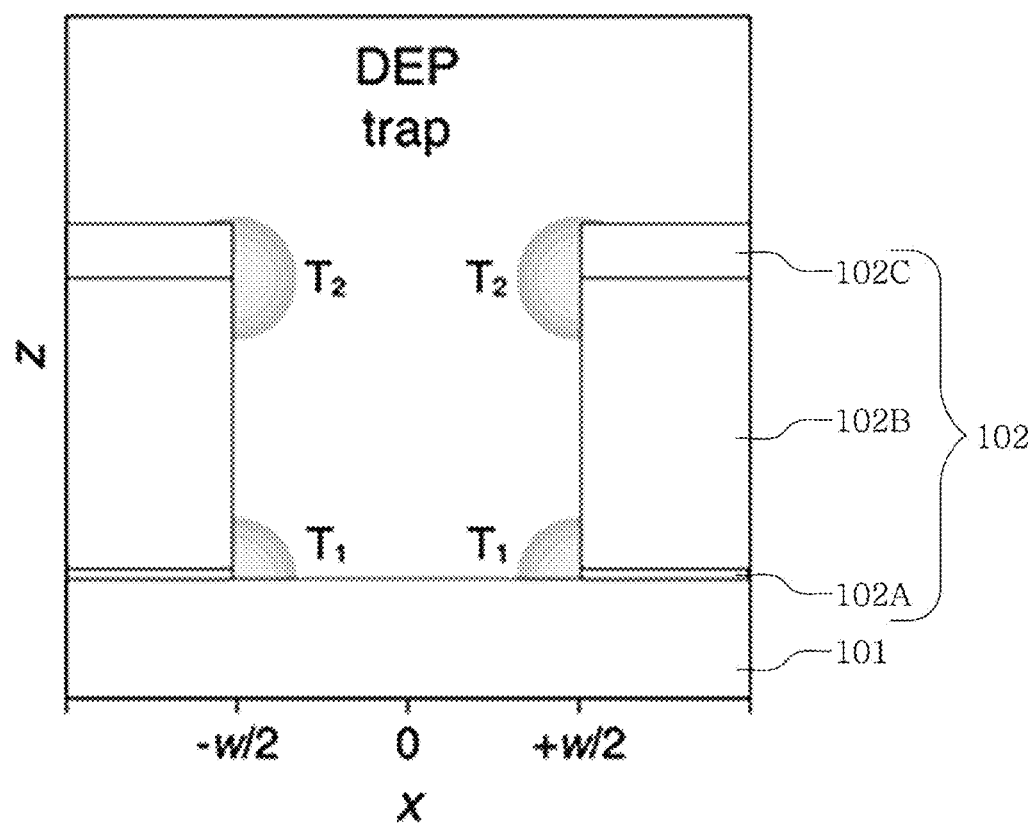

FIG. 2 is an exemplary diagram showing particles captured in the sensing substrate. FIGS. 3 to 5 show a fabrication example of the sensing substrate. FIGS. 6 and 7 are exemplary diagrams showing an area in which the terahertz electromagnetic waves converge to the particle capture structure layer. FIGS. 8 and 9 are exemplary diagrams showing an area in which particles are concentrated and captured in the particle capture structure layer.

Referring to FIGS. 2 to 9, the particle capture structure layer 102 may be a layered structure including a vertical nanogap electrode. In detail, the particle capture structure layer 102 includes a first conductor layer 102A formed on the base substrate 101, an insulating layer 102B formed on the first conductor layer 102A and a second conductor layer 102C formed on the insulating layer 102B. The first conductor layer 102A and the second conductor layer 102C may be made of a metal material to form voltage between. For example, the first conductor layer 102A may be formed of a film made of metals selected from the group consisting of copper, gold, silver, platinum and palladium; alloys or complexes containing at least one type of metal selected from the group consisting of copper, gold, silver, platinum and palladium and at least one type of material selected from the group consisting of graphite, tellurium, tungsten, zinc, iridium, ruthenium, arsenic, phosphorus, aluminum, manganese and silicon; conductive carbon materials selected from the group consisting of graphite, graphene and their derivatives; or mixed metal oxides selected from the group consisting of indium tin oxide (ITO), titanium oxide ($TiO_2$), ruthenium oxide ($RuO_2$), iridium oxide ($IrO_2$), and platinum oxide ($PtO_2$), but is not limited thereto. The second conductor layer 102C may be formed of a film made of metals selected from the group consisting of copper, gold, silver, platinum and palladium; alloys or complexes containing at least one type of metal selected from the group consisting of copper, gold, silver, platinum and palladium and at least one type of material selected from the group consisting of graphite, tellurium, tungsten, zinc, iridium, ruthenium, arsenic, phosphorus, aluminum, manganese and silicon; conductive carbon materials selected from the group consisting of graphite, graphene and their derivatives; or mixed metal oxides selected from the group consisting of indium tin oxide (ITO), titanium oxide ($TiO_2$), ruthenium oxide ($RuO_2$), iridium oxide ($IrO_2$), and platinum oxide ($PtO_2$), but is not limited thereto.

The insulating layer 102B is made of an insulating material to interrupt the electrical connection between the first conductor layer 102A and the second conductor layer 102C. The insulating layer 102B may be formed using non-conductive materials having the insulating properties without limitation. For example, the insulating layer 102B may be made of metal oxides such as $SiO_2$, $Nb_2O_5$, $TiO_2$, $Al_2O_3$, or MgO or polymers such as polyvinylpyrrolidone (PVP), but is not limited thereto. The insulating layer 102B may have such a thickness that a tunneling effect does not occur between the first conductor layer 102A and the second conductor layer 102C. When the insulating layer 102B is less than 5 nm in thickness, due to the short distance between the first and second conductors positioned on the two surfaces, electrons may be transmitted (tunneling) irrespective of the presence or absence of an insulator. Additionally, when the thickness of the insulating layer 102B is larger than 1000 nm, the operating voltage required for effective particle capture increases, causing excessive heat generation from bubbles or a reaction system in a fluid, which remarkably reduces the dielectrophoresis effect and efficiency and/or sensitivity. Accordingly, the insulating layer 102B may be formed with the thickness in the range between 5 and 1000 nm.

Additionally, the particle capture structure layer 102 includes a plurality of slits S patterned in intaglio to expose the surface of the base substrate 101. The plurality of slits S may be formed in a quadrangular prism shape by etching the first conductor layer 102A, the insulating layer 102B and the second conductor layer 102C. The plurality of slits S may be formed in the same pattern. As shown in FIG. 2, the plurality of slits S may be formed by forming holes having a predetermined width and length in the particle capture structure layer 102 in a matrix shape at a predetermined interval. The plurality of slits S may focus the terahertz electromagnetic waves to a predetermined area relative to the wavelength beyond the wavelength limitation. The efficiency of measurement of a trace of particles may be enhanced by focusing the terahertz electromagnetic waves to the plurality of slits S and amplification. The transmittance or reflectance efficiency may be enhanced 100 to 10,000 times or higher compared to simple terahertz electromagnetic wave oscillation devices. The frequency and focal depth of the terahertz electromagnetic waves may be adjusted according to the width, thickness and length of the slit S.

In the exemplary fabrication example of FIGS. 3 to 5, the first conductor layer 102A and the second conductor layer 102C of the particle capture structure layer 102 may be a gold thin film layer. The first conductor layer 102A may be formed with the thickness of 25 nm, the insulating layer 102B may be formed with the thickness of 500 nm, and the second conductor layer 102C may be formed with the thickness of 100 nm. The plurality of slits S may be formed in the length (l)=60 μm, x directional interval ($P_x$)=40 μm, y directional interval ($P_y$)=10 μm by etching to expose the surface of the base substrate 101.

Additionally, the particle capture structure layer 102 may be a structure having a patterned vertical nanogap electrode structure, to capture the particles P using dielectrophoresis (DEP) using the vertical nanogap electrode. Here, the particle P may be a micromaterial harmful to environment, such as fine dust and microplastics, but is not limited thereto. The particle P may be a nano-sized micromolecule (DNA, an aggregate of molecules, a virus, a microbe, bacteria). Dielectrophoresis is a phenomenon in which a force is exerted on the particle P when the particle P is subjected to a non-uniform electric field. The force by the dielectrophoresis does not require the particle to be charged, and all particles exhibit dielectrophoretic activity in the presence of electric fields. The strength of the force of dielectrophoresis $F_{DEP}$ depends on the electrical properties of the medium including the particle and the particle itself and the shape and size of the particle as well as on the frequency of the electric field. Accordingly, the particle, for example, the orientation and/or behavior of the particle may be adjusted using the electric fields of a particular frequency. When the particle is placed in the medium, for example, the fluid, to which the AC in the frequency ω is applied, the force of dielectrophoresis $F_{DEP}$ applied to the particle may be expressed by the following Equation 1.

$$F_{DEP}(\omega) = \pi \varepsilon_m R^3 \cdot \text{Re}(f_{CM}(\omega)) \nabla |E|^2 \qquad \text{[Equation 1]}$$

In the above Equation, ω is the frequency of the AC applied to the dielectrophoresis electrode pair, $\varepsilon_m$ is the dielectric constant of the fluid (medium) around the particle, R is the radius of the particle, E is the magnitude of the electric field, and $\text{Re}(f_{CM}(\omega))$ is the real part of the Clausius-Mossotti (CM) function for the frequency of the applied AC. In the above equation, a factor that determines the sign of the force of dielectrophoresis applied to the particle is the real part of the Clausius-Mossotti (CM) function, and may be calculated by the following Equation 2.

$$f_{CM}(\omega) = \frac{(\varepsilon_p(\omega) - \varepsilon_m(\omega))}{(\varepsilon_p(\omega) + 2\varepsilon_m(\omega))} \quad \text{[Equation 2]}$$

In this instance, ω is the frequency of the AC applied to the dielectrophoresis electrode pair, $\varepsilon_p$ is the dielectric constant of the particle to be captured, and $\varepsilon_m$ is the dielectric constant of the fluid.

When the dielectric constant of the particle is larger than the dielectric constant of the medium under the AC frequency ω, it has a positive Clausius-Mossotti value, that is, $Re[f_{CM}]>0$, and in this instance, DEP is referred to as a positive DEP, and in this state, the particle moves toward a high gradient electric field in a direction facing the electrode, and may be captured in the plurality of slits S. On the contrary, when the dielectric constant of the particle is smaller than the dielectric constant of the medium, it has a negative Clausius-Mossotti value, that is, $Re[f_{CM}]<0$, and in this instance, DEP is referred to as a negative DEP, and in this state, the particle moves toward a low gradient electric field in a direction facing away from the electrode, and is positioned outside of the plurality of slits S.

The particle capture structure layer 102 may capture the particles P to be sensed in the plurality of slits S using dielectrophoresis. That is, the capture of the particles P in the plurality of slits S and dispersion of the particles P may be controlled according to the frequency of the AC frequency applied to the particle capture structure layer 102.

Here, the area in which the terahertz electromagnetic waves converge to the plurality of slits S may match the area in which the particles are captured in the plurality of slits through dielectrophoresis. That is, as the sensing hotspot area on which the terahertz electromagnetic waves converge may match the particle hotspot area in which the particles are captured by dielectrophoresis, the sensing substrate 100 according to an embodiment of the present disclosure can achieve high sensitivity sensing at a specific location where the particles are captured the most.

FIG. 6 shows the intensity of the terahertz electric field around the slit S of the particle capture structure layer 102, and FIG. 7 exemplarily shows the sensing hotspot area on which the terahertz electric field concentrates. The side area and the edge area of the first conductor layer 102A, the insulating layer 102B and the second conductor layer 102C may be exposed to the outside by the formation of the slit S. Here, the terahertz electric field may usually concentrate on the edge area of the slit S. In detail, the terahertz electric field may concentrate on the exposed edge area of the first conductor layer 102A corresponding to the boundary area between the first conductor layer 102A and the base substrate 101 and the boundary area between the first conductor layer 102A and the insulating layer 102B. Additionally, the terahertz electric field may concentrate on the exposed edge area of the second conductor layer 102C corresponding to the boundary area between the second conductor layer 102C and the insulating layer 102B and the boundary area between the second conductor layer 102C and the outside area. Accordingly, as in FIG. 7, the edge area of the first conductor layer 102A and the edge area of the second conductor layer 102C exposed by the slit S may be indicated as the sensing hotspot area on which the terahertz electric field concentrates.

FIG. 8 represents the magnitude distribution of DEP force near the slit S when the AC voltage is formed in the particle capture structure layer 102, and FIG. 9 exemplarily shows the particle hotspot area in which the magnitude of DEP force is large. The DEP force formed by the AC voltage applied to the first conductor layer 102A and the second conductor layer 102C may be strong at the bottom area of the first conductor layer 102A and the bottom area of the second conductor layer 102C. Here, the bottom area of the first conductor layer 102A corresponds to the exposed edge area of the first conductor layer 102A corresponding to the boundary area between the first conductor layer 102A and the base substrate 101 and the boundary area between the first conductor layer 102A and the insulating layer 102B. Additionally, the bottom area of the second conductor layer 102C corresponds to the exposed edge area of the second conductor layer 102C corresponding to the boundary area between the second conductor layer 102C and the insulating layer 102B and the boundary area between the second conductor layer 102C and the outside area. That is, as in FIG. 8, it can be seen that a strong DEP force occurs in the corresponding area, and as in FIG. 9, the edge area of the first conductor layer 102A and the edge area of the second conductor layer 102C exposed by the slit S may be indicated as the particle hotspot area in which the strong DEP force occurs.

That is, when comparing FIGS. 7 and 9, the area in which the terahertz electromagnetic waves converge and the area in which the particles are captured in the plurality of slits through dielectrophoresis may match as the edge area of the first conductor layer 102A and the edge area of the second conductor layer 102C exposed by the plurality of slits.

In the sensing substrate 100 according to an embodiment of the present disclosure, the sensing hotspot area in which the terahertz electromagnetic waves converge and the particle hotspot area in which the particles are captured by dielectrophoresis may match as the edge area of the first conductor layer 102A and the edge area of the second conductor layer 102C. That is, the sensing substrate 100 is a metamaterial designed such that the terahertz electromagnetic waves converge to a location at which the particles are captured the most, and the particle capture type terahertz sensing system 10 may provide terahertz sensing with higher sensitivity through the sensing substrate 100. That is, as the location at which the particles are captured and the location at which the terahertz electromagnetic waves converge match each other, it is possible to maximize the particle sensing efficiency.

Figure 10:
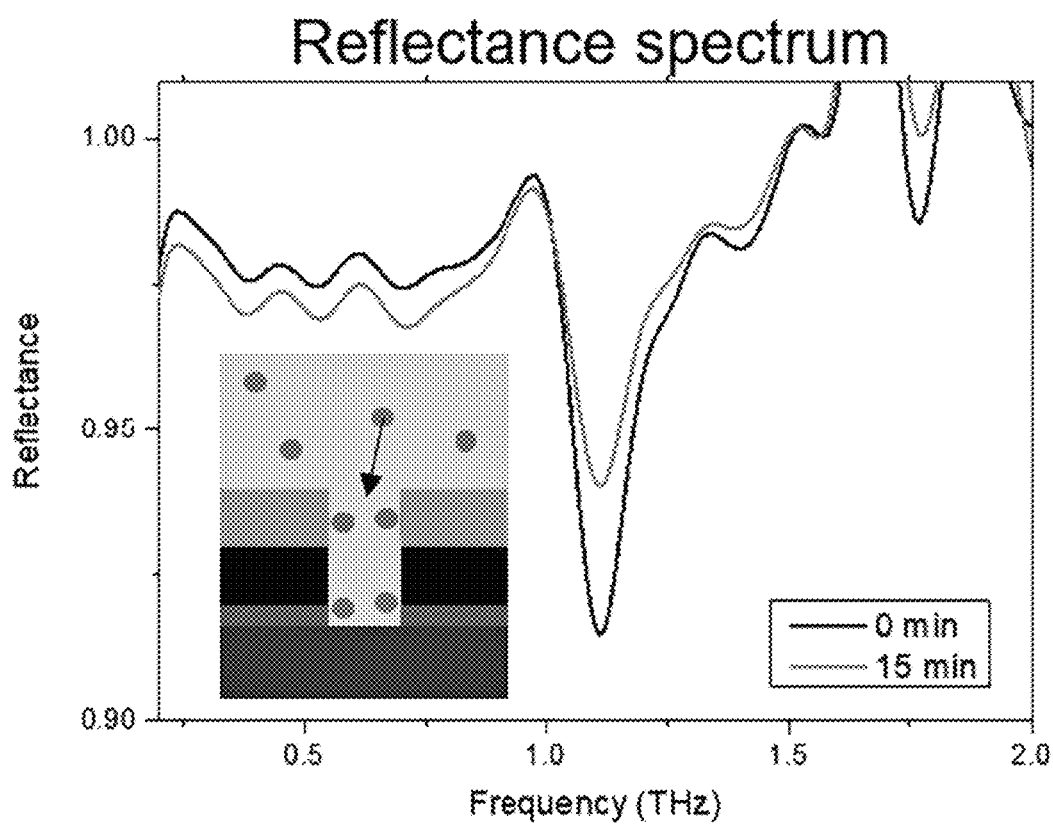
FIG. 10 is a graph showing changes in reflectance spectrum of terahertz electromagnetic waves sensed in a sensing substrate.

FIG. 10 is a graph showing changes in reflectance spectrum of the terahertz electromagnetic waves sensed in the sensing substrate, and shows a comparison of the reflectance spectrum of the terahertz electromagnetic waves measured before voltage for dielectrophoresis is provided (0 min) and in a predetermined time (15 min) after the voltage is provided.

Referring to FIG. 10, after the AC voltage is formed, the particles may move to the edge area of the first conductor layer 102A and the edge area of the second conductor layer 102C exposed by the slits, and may be sensed with high sensitivity by the terahertz electromagnetic waves converging to the corresponding area. When comparing the reflectance spectrum of the terahertz electromagnetic waves measured before the voltage for dielectrophoresis is provided (0 min) with the reflectance spectrum of the terahertz electromagnetic waves measured in the predetermined time (15 min) after the AC voltage for dielectrophoresis is provided, it can be seen that the reflectance in a specific wavelength band greatly changes. The comparison of the reflectance spectrum shows the resonant wavelength band of the terahertz electromagnetic waves of the particles captured in the above-described area. That is, the particle capture type terahertz sensing system 10 may provide qualitative analysis for identifying the properties of the particles.

Additionally, the particle capture type terahertz sensing system 10 may provide quantitative analysis of the particles through the sensing substrate 100.

Figure 11:
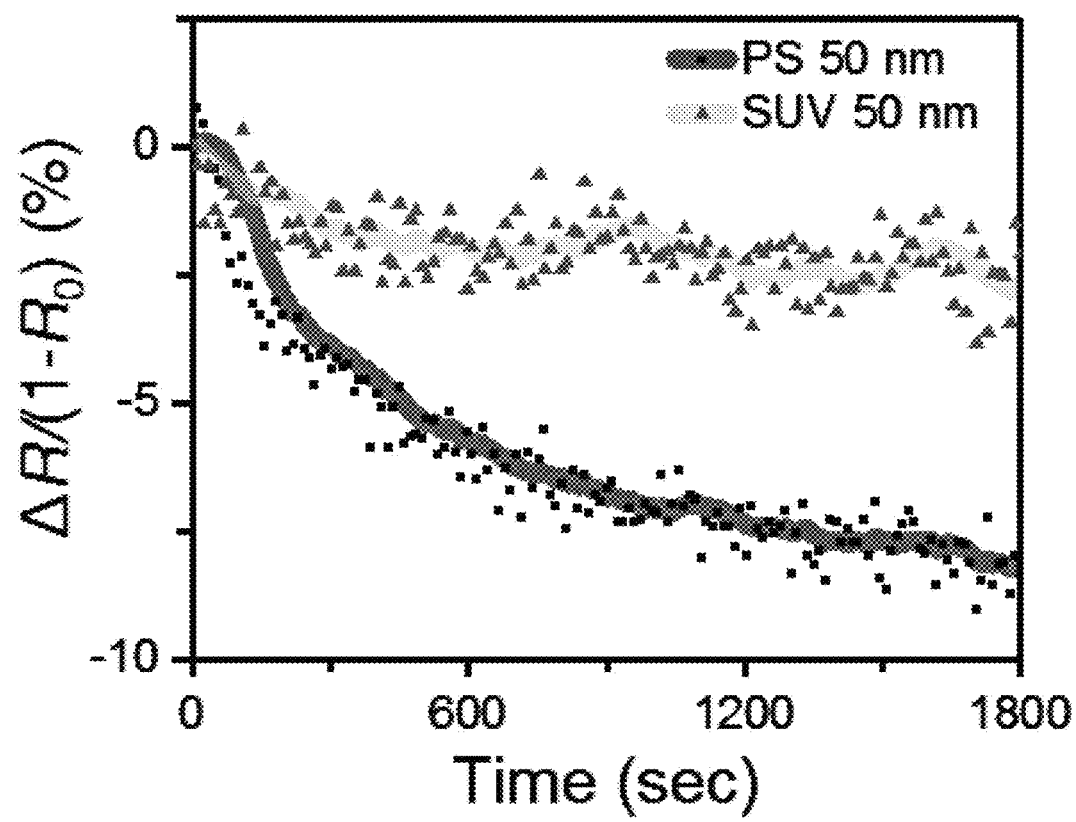
FIG. 11 is a graph showing changes in reflectance signal of terahertz electromagnetic waves by particle capture, observed over time.

FIG. 11 is a graph showing the changes in reflectance signal of the terahertz electromagnetic waves by particle capture, observed over time.

Referring to FIG. 11, when the dielectrophoresis AC voltage is applied, the particles may be captured in the plurality of slits, and accordingly changes occur in the reflectance spectrum of the terahertz electromagnetic waves. In the graph of FIG. 11, X axis indicates the time (sec) during which the dielectrophoresis AC voltage is applied, and Y axis indicates changes in reflectance spectrum. When the AC voltage is applied, the particles are gradually captured in the plurality of slits, and accordingly it can be seen that the reflectance spectrum gradually reduces. It can be seen that the reflectance spectrum quantitatively changes over time. That is, the particle capture type terahertz sensing system 10 may sense the changes in reflectance spectrum according to the amount of particles captured in the plurality of slits, and quantitatively analyze the amount of particles captured in the plurality of slits based on the changes in reflectance spectrum. Additionally, it can be seen that the changes in reflectance spectrum are different depending on the particle type (PS, SUV) at the same particle size of 50 nm. This difference occurs due to a correspondence relationship (unique vibration, absorption relationship) with the terahertz electromagnetic waves provided by the particle capture type terahertz sensing system 10 according to this embodiment. The particle capture type terahertz sensing system 10 according to this embodiment may provide wavelengths of electromagnetic waves corresponding to particles and provide selective capture and analysis of a specific particle.

While the present disclosure has been hereinabove described with reference to the embodiments, it should not be interpreted that the present disclosure is limited to these embodiments, and those skilled in the art will understand that various modifications and changes may be made thereto without departing from the spirit and scope of the present disclosure set forth in the appended claims.

The invention claimed is:

1. A particle capture type terahertz sensing system, comprising:
    a sensing substrate to capture particles; and
    a terahertz sensor to emit terahertz electromagnetic waves to the sensing substrate to sense the particles,
    wherein the sensing substrate includes a base substrate and a particle capture structure layer formed on the base substrate,
    the particle capture structure layer includes a plurality of slits for focusing the terahertz electromagnetic waves,
    the particle capture structure layer captures the particles in the plurality of slits using dielectrophoresis, and
    an area in which the terahertz electromagnetic waves converge to the plurality of slits matches an area in which the particles are captured in the plurality of slits through the dielectrophoresis.

2. The particle capture type terahertz sensing system according to claim 1, wherein the particle capture structure layer includes a first conductor layer formed on the base substrate, an insulating layer formed on the first conductor layer, and a second conductor layer formed on the insulating layer,
    the first conductor layer and the second conductor layer are a dielectrophoresis electrode pair, and
    the particle capture type terahertz sensing system further comprises a voltage supply to form an alternating current voltage in the first conductor layer and the second conductor layer.

3. The particle capture type terahertz sensing system according to claim 2, wherein the plurality of slits is formed by etching the first conductor layer, the insulating layer and the second conductor layer to expose a surface of the base substrate to outside.

4. The particle capture type terahertz sensing system according to claim 3, wherein the area in which the terahertz electromagnetic waves converge and the area in which the particles are captured in the plurality of slits through the dielectrophoresis match as an edge area of the first conductor layer and an edge area of the second conductor layer exposed by the plurality of slits.

5. The particle capture type terahertz sensing system according to claim 1, wherein the terahertz sensor emits the terahertz electromagnetic waves to the sensing substrate, and converges the terahertz electromagnetic waves passing through the sensing substrate to sense the particles.

6. The particle capture type terahertz sensing system according to claim 1, wherein the terahertz sensor emits the terahertz electromagnetic waves to the sensing substrate, and converges the terahertz electromagnetic waves reflected off of the sensing substrate to sense the particles.

7. A sensing substrate that captures particles for sensing using terahertz electromagnetic waves, the sensing substrate comprising:
    a base substrate; and
    a particle capture structure layer formed on the base substrate,
    wherein the particle capture structure layer includes a plurality of slits for focusing the terahertz electromagnetic waves,
    the particle capture structure layer captures the particles in the plurality of slits using dielectrophoresis, and
    an area in which the terahertz electromagnetic waves converge to the plurality of slits matches an area in which the particles are captured in the plurality of slits through the dielectrophoresis.

8. The sensing substrate according to claim 7, wherein the particle capture structure layer includes a first conductor layer formed on the base substrate, an insulating layer formed on the first conductor layer and a second conductor layer formed on the insulating layer, and
    the first conductor layer and the second conductor layer are a dielectrophoresis electrode pair in which the dielectrophoresis occurs by an alternating current voltage applied from outside.

9. The sensing substrate according to claim 8, wherein the plurality of slits is formed by etching the first conductor layer, the insulating layer and the second conductor layer to expose a surface of the base substrate to the outside.

10. The sensing substrate according to claim 9, wherein the area in which the terahertz electromagnetic waves converge and the area in which the particles are captured in the plurality of slits through the dielectrophoresis match as an edge area of the first conductor layer and an edge area of the second conductor layer exposed by the plurality of slits.

* * * * *